United States Patent
Lammerant et al.

(10) Patent No.: US 8,910,726 B2
(45) Date of Patent: Dec. 16, 2014

(54) HARVESTER WITH AN ATTACHMENT FOR A SUPPORT WHEEL AND A METHOD FOR STORING A SUPPORT WHEEL OF A HARVESTER

(75) Inventors: Eddy Lammerant, Koksijde (BE); Johan A. E. Vande Ryse, Bruges (BE); Bart Ryckaert, Waterland Oudeman (BE)

(73) Assignee: CNH Industrial America LLC, New Holland, PA (US)

( * ) Notice: Subject to any disclaimer, the term of this patent is extended or adjusted under 35 U.S.C. 154(b) by 104 days.

(21) Appl. No.: 13/319,488

(22) PCT Filed: May 11, 2010

(86) PCT No.: PCT/EP2010/056473
§ 371 (c)(1),
(2), (4) Date: Feb. 1, 2012

(87) PCT Pub. No.: WO2010/130745
PCT Pub. Date: Nov. 18, 2010

(65) Prior Publication Data
US 2012/0132768 A1 May 31, 2012

(30) Foreign Application Priority Data
May 15, 2009 (BE) .................................. 2009/0309

(51) Int. Cl.
*A01B 49/00* (2006.01)
*A01D 89/00* (2006.01)

(52) U.S. Cl.
CPC .................................. *A01D 89/004* (2013.01)
USPC .............................. 172/311; 172/240; 56/228

(58) Field of Classification Search
USPC ........ 172/240, 248, 313, 310, 1, 311; 56/228, 56/15.6, 192
See application file for complete search history.

(56) References Cited

U.S. PATENT DOCUMENTS

| | | | | |
|---|---|---|---|---|
| 2,779,261 A | * | 1/1957 | Northcote et al. | 172/427 |
| 2,833,105 A | * | 5/1958 | Naery | 56/228 |
| 3,623,300 A | * | 11/1971 | König et al. | 56/6 |
| 4,555,897 A | * | 12/1985 | Degelman | 56/228 |
| 4,723,396 A | * | 2/1988 | Ermacora | 56/13.6 |
| 4,934,131 A | * | 6/1990 | Frisk et al. | 56/192 |
| 4,986,064 A | * | 1/1991 | Ermacora | 56/228 |
| 5,000,268 A | * | 3/1991 | Zimmerman | 172/240 |
| 5,054,560 A | * | 10/1991 | Foley et al. | 172/248 |
| 5,094,063 A | * | 3/1992 | Wattron et al. | 56/6 |

(Continued)

FOREIGN PATENT DOCUMENTS

EP 1048195 A1 * 11/2000 ............. A01B 73/00

*Primary Examiner* — Árpád Fábián-Kovács
(74) *Attorney, Agent, or Firm* — Patrick M. Sheldrake; Seyed V. Sharifi T.

(57) ABSTRACT

A harvester has an attachment, for rotatably supporting the support arm of the support wheel to the frame of the header, that includes a first bearing device with a substantially horizontal axis for rotatably supporting the support arm of the support wheel to the attachment, so that the support arm is tiltable between an operating position and a stowed position. The attachment further has a second bearing device with a substantially vertical axis, for rotatably supporting the attachment to the frame, so that the attachment is tiltable between a first position whereby the axis of the first bearing device substantially transverses the direction of travel and a second position whereby the axis of the first bearing device is substantially parallel to the direction of travel.

8 Claims, 3 Drawing Sheets

(56) References Cited

U.S. PATENT DOCUMENTS

| | | | |
|---|---|---|---|
| 5,107,663 A * | 4/1992 | Wattron et al. | 56/15.7 |
| 5,191,942 A * | 3/1993 | Bussiere | 172/286 |
| 5,199,250 A * | 4/1993 | Ermacora et al. | 56/15.2 |
| 5,357,737 A * | 10/1994 | Ermacora et al. | 56/16.4 R |
| 5,417,042 A * | 5/1995 | Walch et al. | 56/6 |
| 5,641,026 A * | 6/1997 | Balmer | 172/452 |
| 5,970,695 A * | 10/1999 | Dunn | 56/228 |
| 6,152,240 A * | 11/2000 | Nonhoff et al. | 172/311 |
| 6,336,313 B1 * | 1/2002 | Bonnewitz | 56/228 |
| 6,810,653 B2 * | 11/2004 | Derscheid | 56/364 |
| 7,162,854 B2 * | 1/2007 | Yeomans et al. | 56/14.9 |
| 7,347,277 B2 * | 3/2008 | Enns et al. | 172/311 |
| 7,926,249 B1 * | 4/2011 | Cook | 56/228 |
| 8,112,977 B2 * | 2/2012 | Priepke | 56/228 |
| 8,365,509 B2 * | 2/2013 | Tilly et al. | 56/228 |

* cited by examiner

HARVESTER WITH AN ATTACHMENT FOR A SUPPORT WHEEL AND A METHOD FOR STORING A SUPPORT WHEEL OF A HARVESTER

This application is the US National Stage filing of International Application Ser. No. PCT/EP2010/056473 filed on May 11, 2010 which claims priority to Belgium Application BE2009/0309 filed May 15, 2009, each of which is incorporated herein by reference in its entirety.

TECHNICAL FIELD

The present invention relates to a harvester with an attachment for rotatably supporting the support arm of a support wheel on a frame of a header, such as a pickup of a baler or a forage harvester, but also other attachable devices such as headers for combine harvesters.

BACKGROUND ART

The header of such a harvester includes a frame to which a support wheel is mounted by means of an arm. These support wheels can be used to rest the weight of the header at least partially on the ground or to follow the contours of the soil or to ascertain a certain minimum distance between the ground and the bottom of the header. It is known for example from DE29713081U and EP1048195 to rotatably support the support arm of the support wheel on a frame of the header to enable a height adjustment of the support wheel.

To enable a maximum working width of the header in the field one should strive to let the width of the header approach the width allowed for road transport as close as possible. There are a number of possibilities known to reduce the header width during road transport therefor by removing the width of the support wheel and/or its support arm. A first known solution is to remove the support wheels and their support arm to mount them on another place on the harvester during road transport. However, this has the disadvantage that the harvester there is required an additional mounting point on the harvester, that the operator needs to carry the support wheels and support arm to this additional mounting point and that the support wheels get lost quickly because they can easily be removed.

It is also known from for example DE29713081U to provide an attachment for bearing the support arm of the support wheel on the frame of the header that comprises a bearing device for bearing a support arm of the support wheel to the attachment, so that the support arm is tiltable between an operating position and a stowed position. Such a system has the disadvantage that a relatively large space must be available between the rear wall of the frame of the header and the front transport wheels of the harvester, and also that the support arm and its bearing device also take a piece of the available width for the header in the stowed position.

It is known from EP1048195 to arrange the support wheel by means of a linkage system tiltable between an operating position and a stowed position on the support arm of the support wheel. Also such a system has the disadvantage that the support arm and bearing device take a piece of the available width for the header also in the stowed position of the support wheel.

DISCLOSURE OF INVENTION

The present invention aims to provide an answer to the above drawbacks by providing a simple construction with an attachment for the support arm of the support wheel that makes available a maximum width for the header and that requires in the stowed position a minimal space between the rear wall of the frame of the header and the front transport wheels.

According to a first aspect of the present invention there is provided a harvesting machine comprising:
 a header with a frame;
 a support wheel for the header;
 a support arm to which the support wheel is mounted; and
 an attachment for rotatably supporting the support arm of the support wheel to the frame of the header, a first bearing device comprises a substantially horizontal axis for rotatably supporting the support arm of the support wheel on the attachment so that the arm is tiltable between an operating position and a stowed position, characterized in that the attachment further comprises a second bearing device with a substantially vertical axis, for rotatably supporting the attachment to the frame, so that the attachment is tiltable between a first position where the axis of the first bearing device is positioned substantially transverse to the direction of travel and a second position where the axis of the first bearing device is substantially parallel to the direction of travel.

Hereby the full allowed width for road transport is made available to the header, as the support arm of the support wheel in the stowed position is no longer next to the header. Further the support arm of the support wheel and the support wheel in the stowed position requires a minimum space between the rear wall of the frame of the header and the front transport wheels, since the support arm and the support wheel are positioned transversally to the direction of travel then. Furthermore this allows to easily adapt an existing harvester to a harvester according to the invention, even without major changes to the frame of the header and also to the support arm of the support wheel.

According to an embodiment of the invention the first bearing device comprises a bushing and a bearing shaft. This allows to execute this bearing device in a simple way and to reuse this existing bearing device with an existing harvester.

According to another embodiment of the invention the second bearing device comprises a mounting plate that is attached to the frame, comprises a mounting plate that is attached to the first bearing device and a bearing shaft. This enables to achieve the second bearing device in a simple way.

According to an embodiment of the invention the frame comprises an outer sidewall and a rear wall and a bottom wall and/or an inner sidewall.

According to another embodiment of the invention the second bearing device is attached to frame at the height of the inner side wall, the bottom wall or the rear wall of the frame.

According to yet another embodiment of the invention the harvester further comprises an adjustment bar,
 that in the first position of the attachment is attachable on both sides by means of fastening means to the support arm and the outer sidewall of the frame respectively for the height adjustment of the support arm in the operating position and
 that in the second position of attachment is attachable on both sides by means of fastening means to the support arm and the rear wall of the frame respectively for holding the arm in the stowed positions.

This offers the advantage that the same adjustment bar and similar fastening means can be used for holding the support arm in the operating position and in the stowed position.

According to a second aspect of the invention there is provided a method for storing a support wheel of a harvester according to the first aspect of the invention, characterized in that the method comprises the following steps:

tilt the attachment and the support arm of the first position to the second position around the second bearing device, and tilt the support arm up around the first bearing device from the operating position to the stowed position.

Storing the support wheel can thus be executed quickly and by means of easy actions.

BRIEF DESCRIPTION OF DRAWINGS

The invention will now be further described, by way of example, with reference to the accompanying drawings, wherein.

MODE(S) FOR CARRYING OUT THE INVENTION

Figure 1:
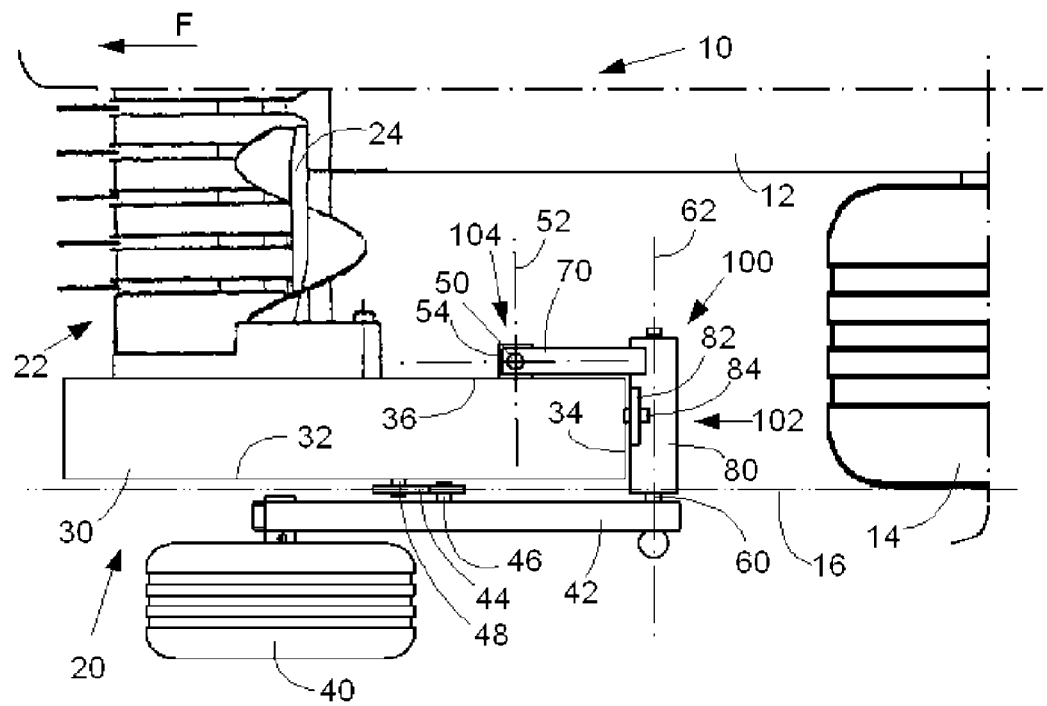
FIG. 1 is a fragment of a schematic top view of a harvesting machine according to the invention with the support arm of the support wheel in the operating position.

FIG. 1 is schematically a fragment of a top view of a harvester 10 according to the invention. It concerns for example a baler or a forage harvester of which a main frame 12 and a front transport wheel 14 attached thereon is shown. The driving direction of the harvester 10 is shown by the arrow F. At the front is a header 20 is attached to the main frame 12. The illustrated header 20 is executed as a pickup of which a pickup drum 22, a pickup auger 24 and a frame 30 is shown. Furthermore, a support wheel 40 for the header 30 is shown. This support wheel is mounted on a support arm 42 which in turn is rotatably supported by means of an attachment 100 to the frame 30 of the header 20.

Figure 2:
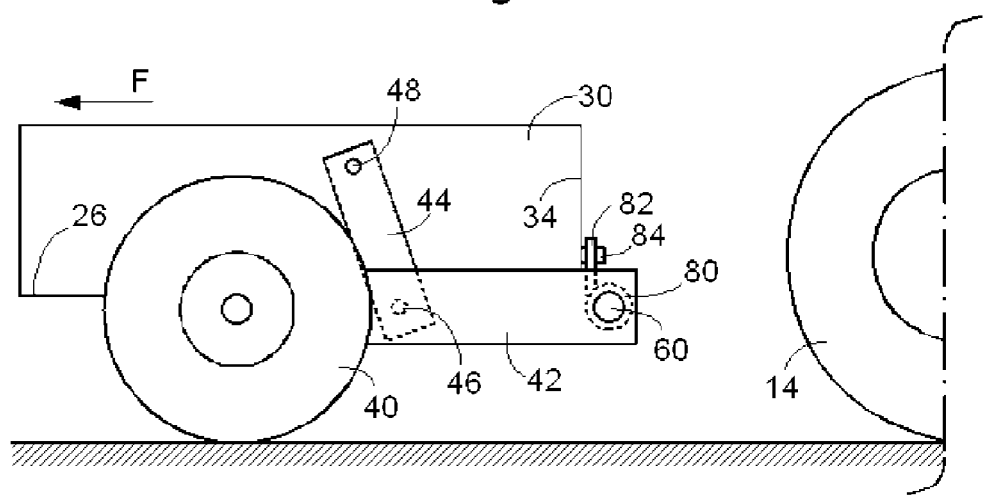
FIG. 2 is a side view of FIG. 1.

As will be seen further in the corresponding side view shown in FIG. 2 the attachment 100 comprises a first bearing device 102 which is executed as a bush 80 in which a bearing shaft 60 is rotatably supported, which is fixed to the support arm 42 of the support wheel 40. This first bearing device has a substantially horizontal axis nearly perpendicular to the direction F as indicated by the dashed-dotted line 62. The attachment 100 further comprises a second bearing device 104 which is executed as mounting plate 54 that is mounted for example by a weld to a bottom wall 26 of the frame 30, a mounting plate 70 that is mounted for example by means of a weld to the bushing 82 of the first bearing device 102 and a bearing shaft 50 that is mounted for example by means of a weld to the mounting plate 54 and cooperates with a corresponding opening in the mounting plate 70. In this way the second bearing device 104 rotatably supports the attachment 100 and so the support arm 42 of the support wheel 40, which is rotatably supported therein, to the frame 30. This second bearing device 104 has a substantially vertical axis as indicated by the axes in dash-dotted line 52.

The attachment 100 shown in FIGS. 1 and 2 further comprises a vertical plate 82 that is mounted to the bushing 80, for example by means of a weld, and by means of removable fastening means 84 to a rear wall 34 of the frame 30. The fastening means 84 may for example be executed as a bolt that can be screwed in a corresponding mounting position in the rear wall 34 or for example as a shaft that is mounted to the rear wall 34 in which a transverse pin can be set or any other known quick-coupling.

Figure 5:
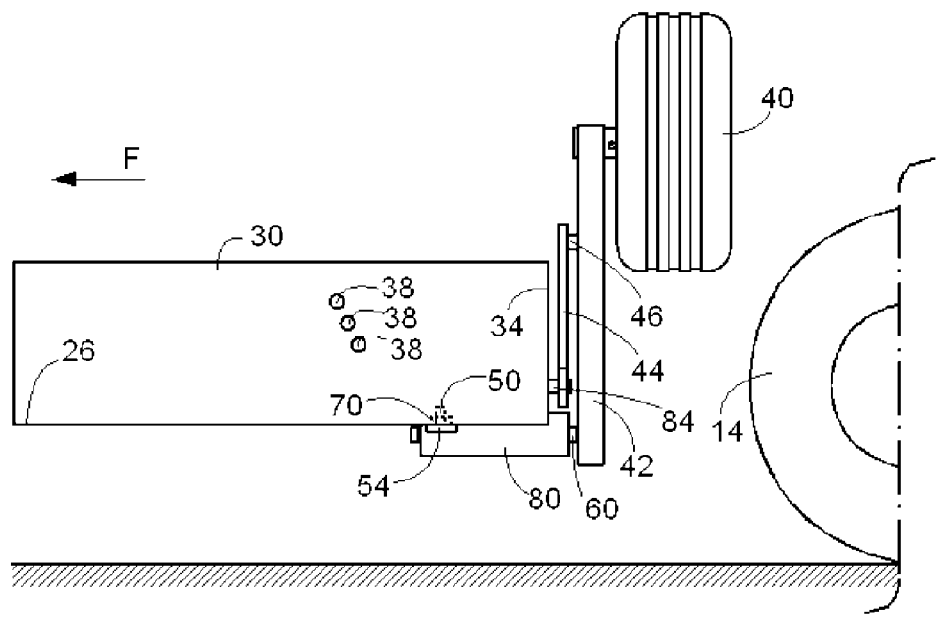
FIG. 5 is a side view of FIG. 4.

Furthermore, in FIGS. 1 and 2 there is shown a known adjustment bar 44 for adjusting the height of the support arm 42 of the support wheel 40. It is attached in a known way at one end by means of fastening means 46 the support arm and at an opposite end by means of fastening means 48 to the frame 30. These fastening means 46, 48 may for example be implemented as a bolt that can be screwed in a corresponding attachment mounting position. As shown in FIG. 5 the frame 30 comprises a number of such mounting positions 38 to enable in a known manner the height adjustment of the support arm 42. It is clear that other fastening means are eligible such as for example a shaft with a transverse pin or other quick-couplers, as also the embodiments mentioned in DE29713081U or EP1048195.

According to an alternative embodiment not shown, the plate 82 and associated fasteners 84 can be omitted.

The position of the arm 42 of the support wheel 40 displayed in FIGS. 1 and 2 is designated as the operating position, ie the position during operation of the harvester in the field, for example during formation of bales in a baler in a field. The limit for the maximum allowable width for road transport is shown with the dashed-double-dotted line 16. It is clear that in the operating position of the maximum allowable width for road transport is exceeded.

Figure 3:
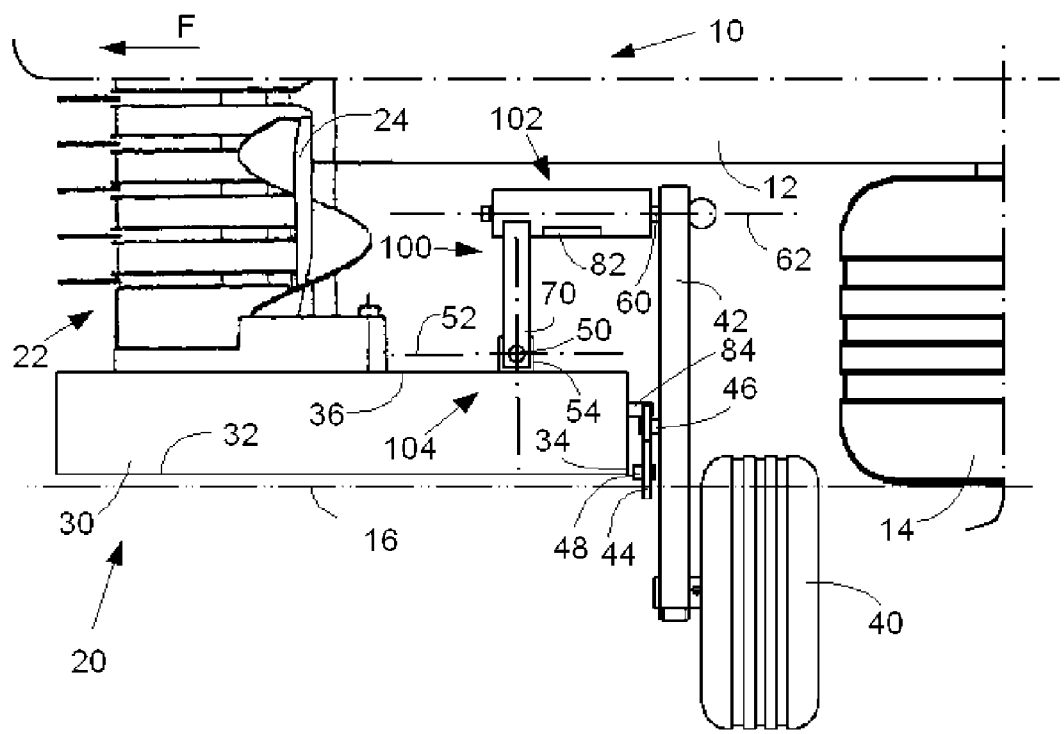
FIG. 3 is a fragment similar to FIG. 1 with the support arm of the support wheel in another position.
Figure 4:
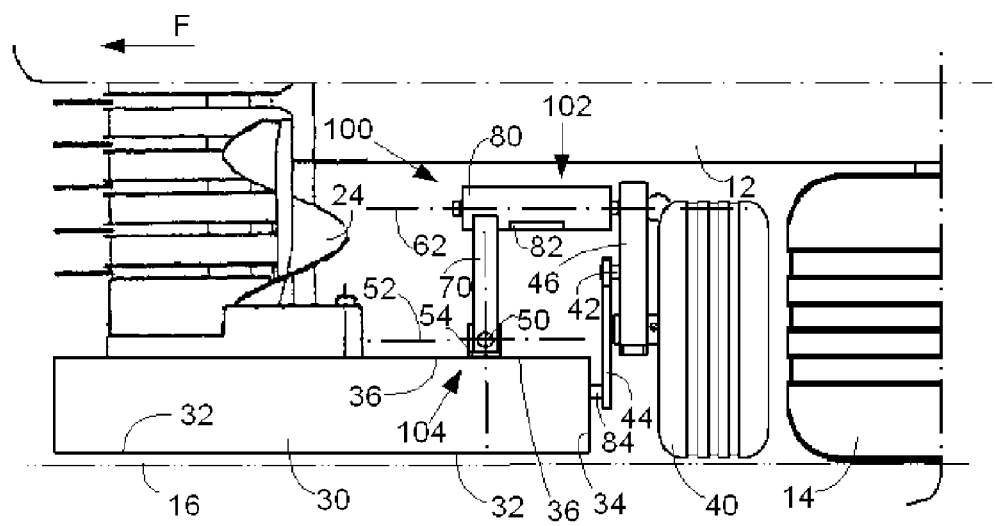
FIG. 4 is a fragment similar to FIG. 1 with the support arm of the support wheel in the stowed position.

When the harvester then must be transported by road the support wheel 40 and its support arm 42 must be tilted to a stowed position as shown in FIGS. 4 and 5 so that the limit for the maximum allowable width 16 for road transport is no longer exceeded. For this the first adjustment bar 44 is detached from the frame 30 of the header 20 by removing or loosening the fastening means 48. Then, the attachment 100 and the support arm 42 are tilted from the position shown in FIGS. 1 and 2, whereby the axis 62 of the first bearing device 102 is substantially transverse to the direction of travel F of the harvester, around the almost vertical axis 52 of the second bearing device 104 to the position in FIG. 3, whereby the axis 62 of the first bearing structure 102 is substantially parallel to the direction of travel F of the harvester. Subsequently the support arm 42 around the substantially horizontal axis 62 of the first bearing device 102 is tilted up to the stowed position. After that the support arm 42 is re-attached to the frame 30 of the header 20 at the height of the rear wall 34 by arranging the adjustment bar 44 to this rear wall, for example by means of the fastening means 84. It is clear that the support arm 42 should not necessarily be attached to this rear wall 34 by means of adjustment rod 44, but that for example any other means for quickly and easily attachment of the support arm 42 to the rear wall 34 can be sufficient, such as for example a chain or an elastic or another known quick-coupling.

It is clear that because the support arm 42 and the support wheel 40 in the stowed position are positioned transverse to the travelling direction F between the frame 30 of the header 20 and the front transport wheel 14, they occupy a minimum of space. Moreover, the full width for road transport becomes available for the header 20 as also the support arm in the stowed position is tilted inward.

According to an alternative embodiment not shown, the second bearing device 104 can be mounted to the bottom wall 26 in such a way that the first bearing device is located entirely under the bottom wall. This is especially advantageous for headers that have a frame that comprises only an outer sidewall 32, a rear wall 34 and a bottom wall 26 and no inner sidewall 36, such as for example a grain cutting device or another header of the type shown in the figures in DE29713081U.

According to another alternative embodiment not shown, the second bearing device 104 comprises only a very short mounting plate 70 or it is directly built into or attached to the first bearing device 102 for example in the bushing 80.

According to another not shown alternative embodiment, the support wheel 40 can, instead of being mounted directly to the support arm 42, as shown in FIGS. 1 to 5, be mounted to the support arm 42 by means of a bracket, as shown in the figures of DE29713081U and EP1048195 so that the support wheel when making a turn can rotate and should not be lifted.

It is clear that many alternative embodiments of the first and second bearing devices 102, 104 are possible and the same goes for their mutual positioning. It is important that the first bearing device 102 comprises an almost horizontal axis for rotatably supporting the support arm 42 and that the second bearing device 104 comprises an almost vertical axis for rotatably supporting the attachment 100, that comprises the first and second bearing device 102, 104, to the frame 30 of the header 20.

The invention as defined in the claims is obviously not limited to the examples described and the embodiments shown in the drawings, but may also include combinations and variations that fall within the scope of the claims.

The invention claimed is:

1. A harvester comprising:
 a header with a frame;
 a support wheel for the header;
 a support arm to which the support wheel is mounted; and
 an attachment for rotatably supporting the support arm of the support wheel to the frame of the header, the attachment comprising a first bearing device with a substantially horizontal axis rotatably supporting the support arm of the support wheel to the attachment so that the support arm is tiltable between an operating position and a stowed position, and a second bearing device with a substantially vertical axis rotatably supporting the attachment to the frame, so that the attachment is tiltable between a first position whereby the axis of the first bearing device substantially transverses the direction of travel and a second position whereby the axis of the first bearing device is substantially parallel to the direction of travel; and
 an adjustment bar that in the first position of the attachment is configured for attachment by at least one fastener to the support arm and a first portion of the frame and in the second position of the attachment is attachable by the at least one fastener to the support arm and a second portion of the frame for holding the arm in the stowed position.

2. A harvester according to claim 1, wherein the first bearing device comprises a bushing and a bearing shaft.

3. A harvester according to claim 1 wherein the second bearing device comprises a first mounting plate that is mounted to the frame-and a second mounting plate mounted to the first bearing device and comprises a bearing shaft.

4. A harvester according to claim 1, wherein the frame comprises an outer sidewall and a rear wall and at least one of a bottom wall and an inner sidewall.

5. A harvester according to claim 4, wherein the second bearing device is mounted to the frame adjacent to the inner side wall, the bottom wall or the rear wall of the frame.

6. A harvester comprising:
 a header with a frame;
 a support wheel for the header;
 a support arm to which the support wheel is mounted; and
 an attachment for rotatably supporting the support arm of the support wheel to the frame of the header, the attachment comprising a first bearing device with a substantially horizontal axis rotatably supporting the support arm of the support wheel to the attachment so that the support arm is tiltable between an operating position and a stowed position, and a second bearing device with a substantially vertical axis rotatably supporting the attachment to the frame, so that the attachment is tiltable between a first position whereby the axis of the first bearing device substantially transverses the direction of travel and a second position whereby the axis of the first bearing device is substantially parallel to the direction of travel;
 wherein the frame comprises an outer sidewall and a rear wall and at least one of a bottom wall and an inner sidewall; and
 wherein the harvester further comprises an adjustment bar that in the first position of the attachment is attachable on both sides by fasteners to the support arm and the outer sidewall of the frame respectively for the height adjustment of the support arm in the operating position and that in the second position of the attachment is attachable on both sides by the fasteners to the support arm and the rear wall of the frame for holding the arm in the stowed position.

7. A harvester according to claim 1, wherein the frame is that of a forage harvester or a baler and the header is a pickup.

8. A method for storing support wheel of a harvester comprising a header with a frame, a support wheel for the header, a support arm to which the support wheel is mounted and an attachment having a first bearing device with a substantially horizontal axis rotatably supporting the support arm of the support wheel to the attachment and movable between a stowed position and a lowered operating position and a second bearing device with a substantially vertical axis rotatably supporting the attachment to the frame for movement including a first position whereby the axis of the first bearing device substantially transverses the direction of travel and a second position whereby the axis of the first bearing device is substantially parallel to the direction of travel, comprises the following steps:
 tilting the attachment and the support arm from the first position to the second position around the second bearing device; and
 tilting the support arm up around the first bearing device from the operating position to the stowed position; and wherein an adjustment bar in the first position of the attachment is attached by at least one fastener to the support arm and a first portion of the frame and in the second position of the attachment is attached by the at least one fastener to the support arm at a second portion of the frame for holding the arm in the stowed position.

* * * * *